(12) United States Patent
Lee et al.

(10) Patent No.: US 8,895,665 B2
(45) Date of Patent: Nov. 25, 2014

(54) MODIFIED CONJUGATED DIENE POLYMER AND SYNTHESIS METHOD THEREOF

(71) Applicant: Chi Mei Corporation, Tainan (TW)

(72) Inventors: Chih-Cheng Lee, Tainan (TW);
Kuei-Lun Cheng, Tainan (TW);
Chen-Pao Huang, Tainan (TW);
Kuan-Lin Hsieh, Tainan (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 13/925,850

(22) Filed: Jun. 25, 2013

(65) Prior Publication Data
US 2014/0179860 A1   Jun. 26, 2014

(30) Foreign Application Priority Data
Dec. 20, 2012   (TW) .............................. 101148801 A

(51) Int. Cl.
*C08K 3/36*   (2006.01)
*C08C 19/25*   (2006.01)

(52) U.S. Cl.
CPC .. *C08C 19/25* (2013.01); *C08K 3/36* (2013.01)
USPC .......................................... 525/105; 524/506

(58) Field of Classification Search
USPC .......................................... 525/105; 524/506
See application file for complete search history.

(56) References Cited

U.S. PATENT DOCUMENTS

| 8,461,263 B2* | 6/2013 | Ko et al. ........................ 525/106 |
| 2008/0275184 A1 | 11/2008 | Karato et al. |
| 2012/0172528 A1* | 7/2012 | Cheng et al. ................. 525/105 |

FOREIGN PATENT DOCUMENTS

CN            1878830            7/2012

OTHER PUBLICATIONS

"Office Action of Taiwan Counterpart Application", issued on Aug. 27, 2014, pp. 1-7.

* cited by examiner

*Primary Examiner* — Margaret Moore
(74) *Attorney, Agent, or Firm* — Jianq Chyun IP Office

(57) ABSTRACT

Provided is a synthesis method of a modified conjugated diene polymer. Conjugated diene monomers are reacted in a reaction system. A modifier is added into the reaction system while the reaction proceeds to a predetermined extent. The modifier has a structure represented by formula (1):

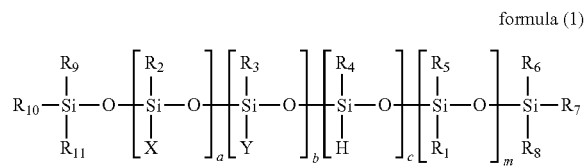

formula (1)

wherein $R_1$-$R_{11}$ each independently represent a $C_1$-$C_5$ alkyl group; $1 \leq m \leq 300$; $0 \leq a \leq 65$; $0 \leq b \leq 65$; $0 \leq c \leq 40$; $0 < a+b$; $0 \leq c/(a+b+c) \leq 0.8$; the X and Y are structures respectively represented by formula (2) and formula (3):

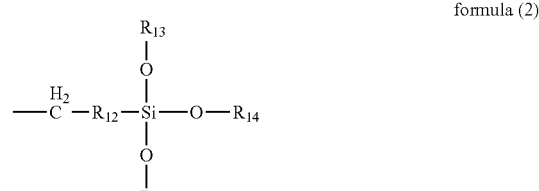

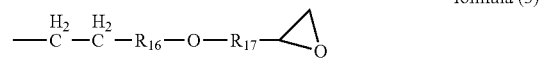

wherein $R_{12}$, $R_{16}$, and $R_{17}$ each independently represent a $C_1$-$C_5$ alkylene group and $R_{13}$-$R_{15}$ each independently represent a $C_1$-$C_5$ alkyl group.

15 Claims, No Drawings

MODIFIED CONJUGATED DIENE POLYMER AND SYNTHESIS METHOD THEREOF

CROSS-REFERENCE TO RELATED APPLICATION

This application claims the priority benefit of Taiwan application serial no. 101148801, filed on Dec. 20, 2012. The entirety of the above-mentioned patent application is hereby incorporated by reference herein and made a part of this specification.

BACKGROUND OF THE INVENTION

1. Field of the Invention

The invention is related to a modified conjugated diene polymer and a synthesis method thereof, and more particularly, to a conjugated diene polymer with good compatibility with silica and a synthesis method thereof.

2. Description of Related Art

The conjugated diene polymer is widely used in resin modification and various industrial products, one application of which is the manufacture of tires. With the rising awareness of environmental protection in recent years, the requirements for tire performance have become high. For instance, it is desired to be able to achieve low fuel consumption and low loss rate. To conform to this trend, it is necessary to improve the mechanical properties of the conjugated diene polymer such as rolling resistance, skid resistance, and tensile strength.

For the conventional tire, carbon black is usually added to the conjugated diene polymer to increase the strength of the tire. However, in recent years, the method of using silica as a reinforcing agent has been proposed in light of problems such as the gradual depletion of petroleum resource and global warming. Since silica is more difficult to disperse uniformly in the conjugated diene polymer as compared to carbon black, it is necessary to improve the compatibility between silica and the conjugated diene polymer.

SUMMARY OF THE INVENTION

The invention provides a modified conjugated diene polymer and a synthesis method thereof. The synthesized conjugated diene polymer has good compatibility with silica.

The invention provides a synthesis method of a modified conjugated diene polymer. The synthesis method of a modified conjugated diene polymer includes:

conducting a polymerization reaction of conjugated diene monomers in a reaction system;

adding a modifier into the reaction system while the polymerization reaction proceeds to a predetermined extent, wherein the modifier has a structure represented by formula (1):

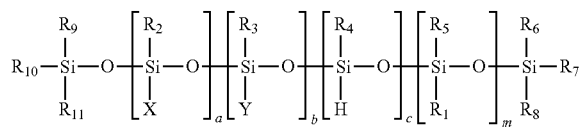

formula (1)

wherein $R_1$-$R_{11}$ each independently represent a $C_1$-$C_5$ alkyl group;

$1 \leq m \leq 300$;

$0 \leq a \leq 65$;

$0 \leq b \leq 65$;

$0 \leq c \leq 40$;

$0 < a+b$;

$0 \leq c/(a+b+c) \leq 0.8$; and the X and Y are structures respectively represented by formula (2) and formula (3):

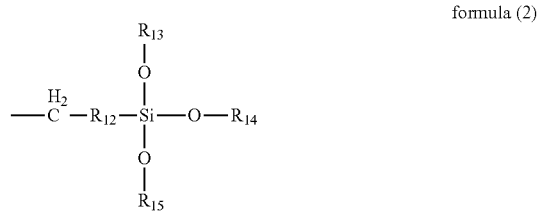

formula (2)

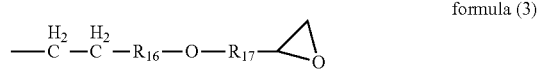

formula (3)

wherein $R_{12}$, $R_{16}$, and $R_{17}$ each independently represent a $C_1$-$C_5$ alkylene group and $R_{13}$-$R_{15}$ each independently represent a $C_1$-$C_5$ alkyl group.

In an embodiment of the invention, the modifier has a structure represented by formula (4):

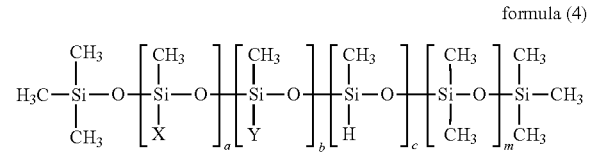

formula (4)

wherein the X and Y are structures respectively represented by formula (5) and formula (6):

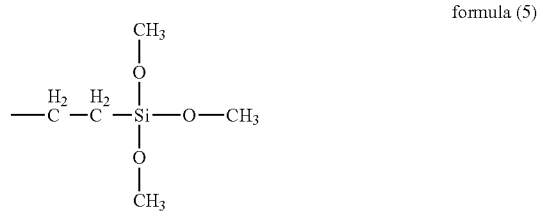

formula (5)

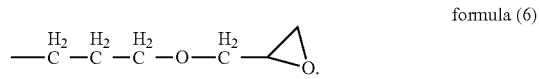

formula (6)

In an embodiment of the invention, $c/(a+b+c) \leq 0.6$.

In an embodiment of the invention, $c=0$.

In an embodiment of the invention, $0.2 \leq a/(a+b+c) \leq 0.9$ and $0.10 \leq b/(a+b+c) \leq 0.8$.

In an embodiment of the invention, $a/(a+b+c)=0.6$ and $b/(a+b+c)=0.4$.

In an embodiment of the invention, $3 \leq m \leq 280$.

In an embodiment of the invention, based on a total amount of 100 parts by weight of the modified conjugated diene polymer, the amount of the modifier is 0.1 parts by weight to 5.0 parts by weight, preferably 0.2 parts by weight to 3.0 parts by weight, and more preferably 0.5 parts by weight to 2.0 parts by weight.

In an embodiment of the invention, the predetermined extent of the polymerization reaction refers to the reaction system reaching the highest temperature.

The invention provides a modified conjugated diene polymer. The modified conjugated diene polymer is made by the synthesis method of the modified conjugated diene polymer.

The invention provides a modified conjugated diene polymer. The modified conjugated diene polymer includes:
a conjugated diene polymer backbone; and
a modifying group, wherein the modifying group has a structure represented by formula (1):

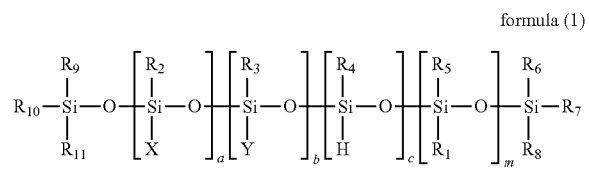

formula (1)

wherein $R_1$-$R_{11}$ each independently represent a $C_1$-$C_5$ alkyl group;

$1 \leq m \leq 300$;

$0 \leq a \leq 65$;

$0 \leq b \leq 65$;

$0 \leq c \leq 40$;

$0 < a+b$;

$0 \leq c/(a+b+c) \leq 0.8$; and the X and Y are structures respectively represented by formula (2) and formula (3):

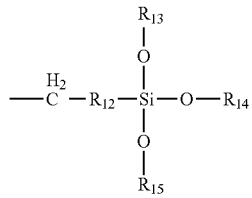

formula (2)

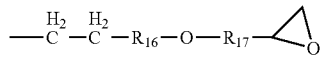

formula (3)

wherein $R_{12}$, $R_{16}$, and $R_{17}$ each independently represent a $C_1$-$C_5$ alkylene group, $R_{13}$-$R_{15}$ each independently represent a $C_1$-$C_5$ alkyl group, and the modifying group is physically joined or chemically bonded to the conjugated diene polymer backbone.

In an embodiment of the invention, $c/(a+b+c) \leq 0.6$.

In an embodiment of the invention, $c=0$.

In an embodiment of the invention, $0.2 \leq a/(a+b+c) \leq 0.9$ and $0.10 \leq b/(a+b+c) \leq 0.8$.

In an embodiment of the invention, $a/(a+b+c)=0.6$ and $b/(a+b+c)=0.4$.

In an embodiment of the invention, the cis content of the conjugated diene polymer is greater than 90%.

The invention provides a rubber composition. The rubber composition includes silica and any one of the modified conjugated diene polymers mentioned.

Based on the above, the invention provides a synthesis method of a modified conjugated diene polymer. The modified conjugated diene polymer synthesized by the method has good compatibility with silica and is therefore suitable for making high-quality tires.

In order to make the aforementioned features and advantages of the invention more comprehensible, embodiments accompanied with figures are described in detail below.

DESCRIPTION OF THE EMBODIMENTS

The modified conjugated diene polymer and the synthesis method thereof are described in detail in the embodiments below.

In the specification, if it is not specified whether a particular group is substituted or not, then the group can represent a substituted or an unsubstituted group. For instance, "alkyl group" can represent a substituted alkyl group or an unsubstituted alkyl group. In addition, when a particular group is described with "$C_x$", it means the main chain of the group has X number of carbon atoms.

In the specification, "phr (part per hundred rubber)" is used as the unit for the amount of the additive. It is a common terminology in the field of rubber synthesis, and means "parts by weight added per 100 parts by weight of rubber"; here, the so-called "rubber" refers to the conjugated diene polymer. Moreover, in the specification, in descriptions relating to the polymerization reaction, the weight of the conjugated diene polymer and the total weight of the conjugated diene monomers before polymerization are considered equal. In other words, when the amount of the additive is expressed in phr, the phr can be based on 100 parts by weight of the conjugated diene polymer and can also be based on 100 parts by weight of the conjugated diene monomers.

The first embodiment of the invention provides a synthesis method of a modified conjugated diene polymer. The synthesis method of a modified conjugated diene polymer includes the following steps:

Step A: conducting a polymerization reaction of conjugated diene monomers in a reaction system;

Step B: adding a modifier into the reaction system while the polymerization reaction proceeds to a predetermined extent.

Step A is described first.

Options of the conjugated diene monomer include 1,3-butadiene, isoprene, 1,3-pentadiene, 2-ethyl-1,3-butadiene, 2,3-dimethyl-butadiene, 2-methyl-pentadiene, 4-methyl-pentadiene, 2,4-hexadiene, or a combination thereof. In an embodiment, the conjugated diene monomer is 1,3-butadiene.

A 1,4-polymerization or a 1,2-polymerization can be conducted on the conjugated diene monomer to form a 1,4-structural unit or a 1,2-structural unit. "1,4-polymerization" refers to the bonding of one conjugated diene monomer to another monomer through carbons at 1 and 4 positions of the conjugated diene monomer. The 1,4-structure obtained in this manner can be further divided into a cis-structure and a trans-structure; similarly, "1,2-polymerization" refers to the bonding of one conjugated diene monomer to another monomer through carbons at 1 and 2 positions of the conjugated diene monomer. The 1,2-structure obtained from 1,2-polymerization is a structure having a vinyl group at the side chain. The 1,4-structure and the 1,2-structure may co-exist in a polymer chain. For instance, when polymerization is conducted with a 1,3-butadiene monomer, a 1,2-polybutadiene structural unit or a 1,4-polybutadiene structural unit can be produced.

A polymerization reaction of the conjugated diene monomer can be conducted in the presence of a catalyst composition.

In an embodiment, the catalyst composition can include a solution of lanthanide carboxylate, a solution of organoaluminum compound, and a solution of Lewis acid. In other embodiments, a small amount of the conjugated diene monomer can be added in the catalyst composition to increase the catalytic activity of the catalyst composition, shortening the induction time of the catalyst composition in the initial stage of polymerization.

The catalyst composition is related to the final structure of the conjugated diene polymer. For instance, by using a specific catalyst composition, a conjugated diene polymer having a high-cis structure can be synthesized. The concept is explained in the <Experiments> portion later on.

Step B is described below.

The modifier is added into the reaction system while the polymerization reaction in step A proceeds to a predetermined extent. In each embodiment, the modifier has the structure represented by formula (1):

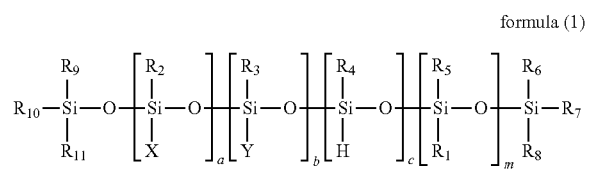

formula (1)

wherein $R_1$-$R_{11}$ each independently represent a $C_1$-$C_5$ alkyl group;

the X and Y are structures respectively represented by formula (2) and formula (3):

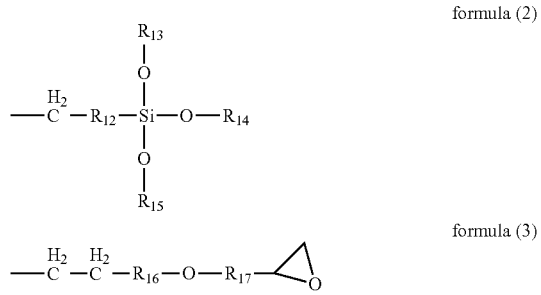

formula (2)

formula (3)

wherein $R_{12}$, $R_{16}$, and $R_{17}$ each independently represent a $C_1$-$C_5$ alkylene group and $R_{13}$-$R_{15}$ each independently represent a $C_1$-$C_5$ alkyl group.

In an embodiment, the modifier has the structure represented by formula (4):

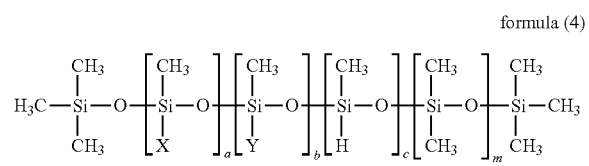

formula (4)

wherein the X and Y are structures respectively represented by formula (5) and formula (6):

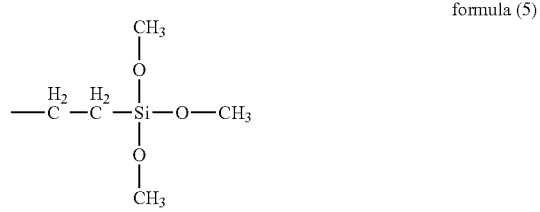

formula (5)

formula (6)

The X group in the modifier has a similar structure to silica, and can therefore increase the compatibility between the modified conjugated diene polymer and silica. The Y group in the modifier has an epoxy group with good affinity toward silica, which can also increase the compatibility between the conjugated diene polymer and silica. Moreover, the epoxy group and the alkoxysilane group in the modifier can form chemical bonds with the conjugated diene polymer. However, although each of the groups has its own function, the presence thereof can affect each other or produce some adverse effects. For instance, if there are an excessive number of Si—H bonds, the addition of the modifier can cause gelation of the conjugated diene polymer. Accordingly, the proportion of each repeating unit containing the groups in the modifier is as the preferred range below:

$1 \leq m \leq 300$;

$0 \leq a \leq 65$;

$0 \leq b \leq 65$;

$0 \leq c \leq 40$;

$0 < a+b$; and $0 \leq c/(a+b+c) \leq 0.8$.

In an embodiment, $3 \leq m \leq 280$.

In an embodiment, $c/(a+b+c) \leq 0.6$ is preferable and $c=0$ is more preferable.

In an embodiment, $0.2 \leq a/(a+b+c) \leq 0.9$; and $0.10 \leq b/(a+b+c) \leq 0.8$.

In an embodiment, it is preferred that $a/(a+b+c)=0.6$ and $b/(a+b+c)=0.4$.

The timing of adding the modifier affects the bonding mode of the modifier and the conjugated diene polymer. If the modifier is added after the polymerization reaction is completed, it is likely that only physical bonding (such as bonding by a van der Waals' force) occurs between the modifier and the conjugated diene polymer; on the other hand, if the modifier is added into the reaction system before the polymerization reaction is completed, both physical and chemical bonding may occur between the modifier and the conjugated diene polymer. For instance, as described above, the epoxy group or the silane group in the modifier reacts with the unsaturated bond in the conjugated diene polymer to produce bonding. In an embodiment, the modifier is added into the reaction system while the reaction system reaches the highest temperature during the polymerization reaction, such that both physical and chemical bonding occur between the modifier and the conjugated diene polymer.

In an embodiment, the amount of the modifier is 0.5 phr to 2.0 phr.

The invention provides a modified conjugated diene polymer. The modified conjugated diene polymer is made by the abovementioned synthesis method, and the cis content thereof is greater than 90%.

The invention also provides a modified conjugated diene polymer. The modified conjugated diene polymer includes a conjugated diene polymer backbone with a cis content greater than 90% and a modifying group. The modifying group has the structure represented by formula (1):

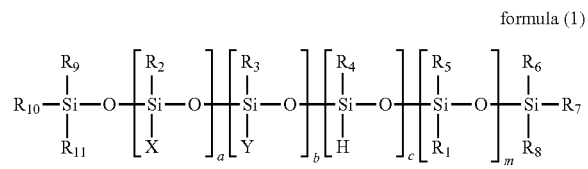

formula (1)

wherein $R_1$-$R_{11}$ each independently represent a $C_1$-$C_5$ alkyl group; $1 \leq m \leq 300$; $0 \leq a \leq 65$; $0 \leq b \leq 65$; $0 \leq c \leq 40$; $0 < a+b$; $0 \leq c/(a+b+c) \leq 0.8$; and the X and Y are structures respectively represented by formula (2) and formula (3):

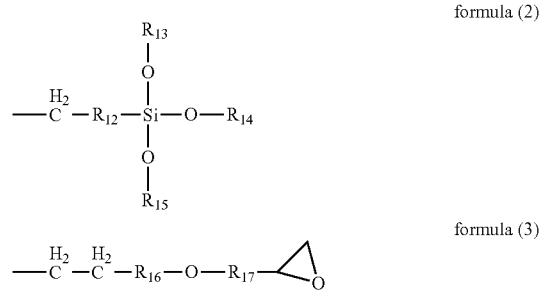

formula (2)

formula (3)

wherein $R_{12}$, $R_{16}$, and $R_{17}$ each independently represent a $C_1$-$C_5$ alkylene group, $R_{13}$-$R_{15}$ each independently represent a $C_1$-$C_5$ alkyl group, and the modifying group is physically joined or chemically bonded to the conjugated diene polymer backbone.

The invention further provides a rubber composition. The rubber composition includes silica and any one of the modified conjugated diene polymers mentioned.

The invention further provides a rubber composition. The rubber composition is made by modifying the conjugated diene polymer using the modifier and a compounding method at the same time the unmodified high-cis conjugated diene polymer is being used to make the rubber composition.

Experiments

I. Preparation of Catalyst Composition

Using n-hexane as a solvent, a mixture of 0.162 mol of neodymium neodecanoate, 1.296 mol of diisobutyl aluminum hydride (DIBAH), and 0.486 mol of diethylaluminium chloride (DEAC) is prepared under room temperature, wherein in the catalyst composition, neodymium (Nd) accounts for 0.26 wt %. Number of moles of neodymium neodecanoate:sum of the number of moles of both DEAC and DIBAH is 1:11; number of moles of neodymium neodecanoate:number of moles of DEAC is controlled at 1:3. Of course, a commercially available catalyst composition can also be used, such as the NDV 40 (trade name, purchased from the Rhodia Corporation).

II. Synthesis Examples

Preparation of Modified and Unmodified Conjugated Diene Polymer

N-hexane is injected into a reaction tank in the amount of 60 kg and heated with the temperature of the reaction tank set at 60° C. Next, 9 kg of butadiene is weighed and injected into the reaction tank. Then, 2 kg of n-hexane is injected into the reaction tank. Afterward, 900 g of the catalyst composition (Nd 0.26 wt %) obtained from the step of "preparation of catalyst composition" is added into the reaction tank. After the reaction tank reaches the highest temperature (60° C.), 90 g of the modifier is weighed and injected into the reaction tank. After 30 minutes of stirring, the product is discharged to obtain the modified conjugated diene polymer. Specifically, the modifier has a structure represented by:

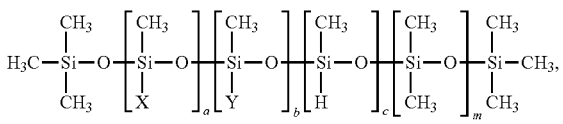

wherein the X and Y are structures respectively represented by formula (5) and formula (6):

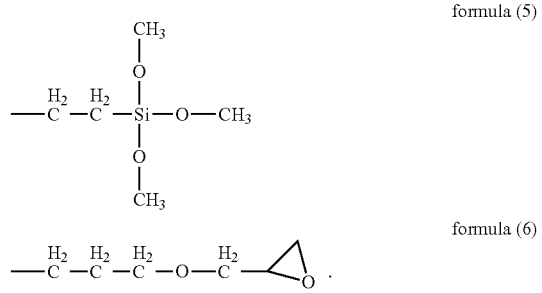

formula (5)

formula (6)

Depending on different values of m, a, b, and c of the modifier, the product can be categorized into synthesis example 1 to synthesis example 8 and synthesis examples 10 and 11, as shown in Table 1. In particular, the content ratio of Si—H bonds is too high for synthesis example 10 and synthesis example 11, that is, $c/(a+b+c)>0.8$, which causes gelation to the modified conjugated diene polymer. As a result, subsequent production of the rubber composition of synthesis example 10 and synthesis example 11 can not proceed.

In the preparation method, after the reaction tank reaches the highest temperature (60° C.), the modifier is not added. Instead, the mixture is only stirred for about 30 minutes. Then, the product is discharged, and the unmodified conjugated diene polymer of synthesis example 9 can be obtained.

The polymer of each of synthesis example 1 to synthesis example 11 is analyzed with infrared (IR absorption value of 740 cm$^{-1}$), and the cis content of each thereof is measured to be greater than 98%.

III. Rubber Composition

The materials used in the preparation of the rubber composition are as follows:

| | |
|---|---|
| silica | ULTRASIL EVONIK |
| processing oil | CNPC #3 |
| antioxidant (Ix-1076) | CIBA |
| Si69 (bis-3-(triethoxysilylpropyl)tetrasulfide) | Degussa AG |
| zinc oxide (ZnO) | HA |
| stearic acid (TPSA1865) | |
| diphenyl guanidine | FLEXSYS |
| n-cyclohexyl-2-benzo thiazolesulphenamide (CBS) | FLEXSYS |
| sulfur | Triangle Brand |

The modified or unmodified conjugated diene polymer of each of synthesis examples 1-9 listed in Table 1 is taken in the amount of 700 g and individually mixed with the materials used in the preparation of the rubber composition for 1 minute. Then, 30 phr of silica, 10 phr of processing oil, 1 phr of antioxidant, and 4.8 phr of silane coupling agent Si69 are added and mixed for 1.5 minutes. Here, the modified conjugated diene polymer of each of synthesis examples 1-8 in Table 1 is used in embodiments 1-8, and c/(a+b+c)≤0.8. Comparative example 1 uses the unmodified conjugated diene polymer of synthesis example 9 in Table 1.

Then, 30 phr of silica is further added, and when the temperature reaches 150° C., the mixture is removed, flattened with a roller, and cooled to room temperature. Next, zinc oxide, stearic acid, and diphenylguanidine are added in the amount of 2 phr each and the mixture is further mixed. The process is completed in a banbury mixer. Next, 2 phr of n-cyclohexyl-2-benzothiazolesul phenamide (CBS) and 2 phr of sulfur are added, and the rubber composition of each of embodiments 1-8 and comparative example 1 can be obtained. The process is completed in a roll mixer.

The following properties are tested for the rubber composition of each of comparative example 1 and embodiments 1-8: dynamic storage elastic modulus (ΔE), Mooney viscosity, tensile strength ($Ts_b$), loss tangent (tan δ), and abrasion loss. The descriptions of the tests are as follows, and the results are presented in Table 2.

The Mooney viscosity of the rubber composition is measured by the machine Model MV-2000 of the Alpha Technology Corporation with reference to ASTM D-1646. The condition of the measuring temperature is 100° C. and the measuring time is 1+4 minutes. The smaller the value in the table, the lower the viscosity of the end product, and the easier the processing.

The tensile strength is measured by the ASTM D-412 DieC method. Tensile strength represents the maximum stress a test specimen can withstand during a stretching process. The measuring mode of tensile strength is a stretching mode, and the measuring frequency is 20 Hz and the temperature is set at 60° C.

The dynamic storage elastic modulus (ΔE) and loss tangent (tan δ) of the rubber composition are measured with a dynamic mechanical analyzer Model DMA Q800 made by the TA Instruments Corporation. The temperature for measuring dynamic storage elastic modulus (ΔE) is set at 60° C. and the degree of deformation of the measurement is 0.5% to 10%. The dynamic storage modulus difference of elasticity (ΔE') can be obtained by deducting the dynamic storage elastic modulus measured under the degree of deformation of 10% from the dynamic storage elastic modulus measured under the degree of deformation of 0.5%. The smaller the value of the dynamic storage modulus difference of elasticity (ΔE'), the better the compatibility between the rubber composition and silica. ΔE' is also called Payne effect.

The temperature rising rate when measuring loss tangent (tan δ) is 3° C. per minute, and the temperature for measuring loss tangent is selected to be 60° C. The lower the loss tangent at 60° C., the lower the rolling resistance of the rubber composition.

The abrasion loss is measured by the abrasion testing machine GT-7012-D with reference to DIN53 516, with a test piece size of 29 cm (diameter)×12.5 mm (thickness). The smaller the data of abrasion loss, the better the abrasion resistance capability.

TABLE 1

| | m | a | b | c |
|---|---|---|---|---|
| Synthesis example 1 | 3.74 | 65 | 0 | 0 |
| Synthesis example 2 | 3.74 | 54.6 | 10.4 | 0 |
| Synthesis example 3 | 3.74 | 0 | 65 | 0 |
| Synthesis example 4 | 3.74 | 38.4 | 26.6 | 0 |
| Synthesis example 5 | 275.93 | 55.123 | 0 | 0 |
| Synthesis example 6 | 275.93 | 34.1 | 20.9 | 0 |
| Synthesis example 7 | 275.93 | 0 | 55.123 | 0 |
| Synthesis example 8 | 275.93 | 15.5 | 5.998 | 33.625 |
| Synthesis example 9 | — | — | — | — |
| Synthesis example 10 | 3.74 | 13 | 0 | 52 |
| Synthesis example 11 | 275.93 | 11.123 | 0 | 44 |

*Synthesis example 10 and synthesis example 11 could not be tested due to gelation of the conjugated diene polymer caused by an excessive amount of Si—H bonds in the modifier.

TABLE 2

| | ΔE' | tanδ (60° C.) | Mooney viscosity (MU) | $Ts_b$ | Abrasion loss |
|---|---|---|---|---|---|
| Embodiment 1 | 2.81 | 0.042 | 65 | 65 | 0.0135 |
| Embodiment 2 | 3.48 | 0.037 | 65 | 63 | 0.0131 |
| Embodiment 3 | 2.83 | 0.04 | 66 | 97 | 0.0144 |
| Embodiment 4 | 2.75 | 0.037 | 64 | 60 | 0.013 |
| Embodiment 5 | 2.82 | 0.043 | 65 | 59 | 0.0147 |
| Embodiment 6 | 2.17 | 0.037 | 63 | 56 | 0.0144 |
| Embodiment 7 | 2.91 | 0.039 | 68 | 69 | 0.0147 |
| Embodiment 8 | 2.53 | 0.038 | 66 | 62 | 0.0143 |
| Comparative example 1 | 3.66 | 0.044 | 60 | 52 | 0.0152 |

It is shown from Table 2 that each dynamic storage modulus difference of elasticity of embodiment 1 to embodiment 8 is much better than that of comparative example 1, proving that by using the modified conjugated diene polymer, the compatibility between the rubber and silica can be further improved. Among these embodiments, embodiment 4 and embodiment 6 exhibit the best results, indicating that the modifier can have the best results when a/(a+b+c) equals to about 0.6 and b/(a+b+c) equals to about 0.4.

The tan δ (60° C.) of the rubber material made in each of embodiments 1-8 is less than the tan δ (60° C.) of the rubber material made in comparative example 4, indicating the rubber material of each of embodiments 1-8 has less rolling resistance compared to the rubber material made in comparative example 1.

The rubber material made in each of embodiments 1-8 and comparative example 1 has a comparable Mooney viscosity, indicating the addition of the modifier does not affect the processability. In addition, in comparison to the rubber material made in comparative example 1, each rubber material made in embodiments 1-8 has higher tensile strength and lower abrasion loss.

Based on the above, the modified conjugated diene polymer of the invention has good compatibility with silica and is therefore suitable for making high-quality tires.

Although the invention has been described with reference to the above embodiments, it will be apparent to one of the ordinary skill in the art that modifications and variations to the described embodiments can be made without departing from the spirit and scope of the invention. Accordingly, the scope of the invention will be defined by the attached claims not by the above detailed descriptions.

What is claimed is:

1. A synthesis method of a modified conjugated diene polymer, comprising:
   conducting a polymerization reaction of conjugated diene monomers in a reaction system;
   adding a modifier into the reaction system,
   wherein the modifier has a structure represented by formula (1):

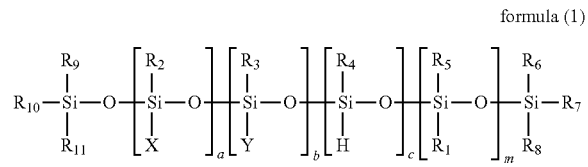
formula (1)

wherein $R_1$-$R_{11}$ each independently represent a $C_1$-$C_5$ alkyl group;

$1 \leq m \leq 300$;

$0 \leq a \leq 65$;

$0 \leq b \leq 65$;

$0 \leq c \leq 40$;

$0 < a+b$;

$0 \leq c/(a+b+c) \leq 0.8$; and the X and Y are structures respectively represented by formula (2) and formula (3):

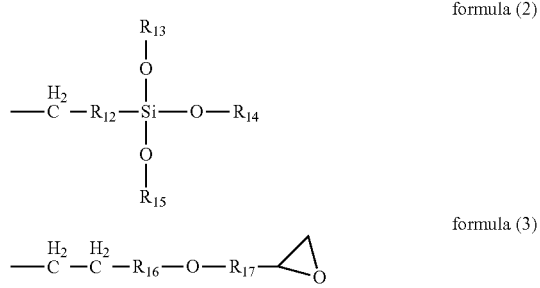
formula (2)

formula (3)

wherein $R_{12}$, $R_{16}$, and $R_{17}$ each independently represent a $C_1$-$C_5$ alkylene group and $R_{13}$-$R_{15}$ each independently represent a $C_1$-$C_5$ alkyl group.

2. The synthesis method of claim 1, wherein the modifier has a structure represented by formula (4):

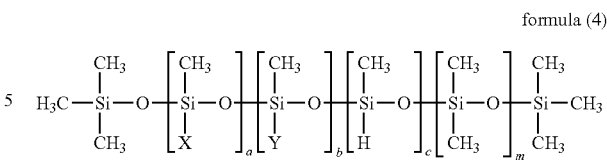
formula (4)

wherein the X and Y are structures respectively represented by formula (5) and formula (6):

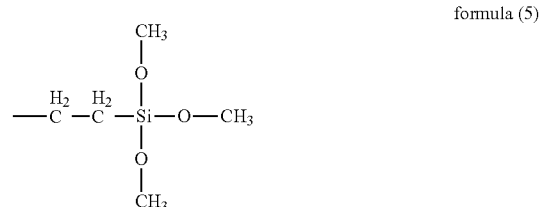
formula (5)

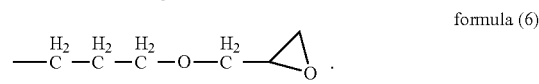
formula (6)

3. The synthesis method of claim 1, wherein $c/(a+b+c) \leq 0.6$.

4. The synthesis method of claim 3, wherein $c=0$.

5. The synthesis method of claim 1, wherein $0.2 \leq a/(a+b+c) \leq 0.9$ and $0.10 \leq b/(a+b+c) \leq 0.8$.

6. The synthesis method of claim 1, wherein $3 \leq m \leq 280$.

7. A modified conjugated diene polymer made by the synthesis methods of claim 1.

8. A modified conjugated diene polymer, comprising:
   a conjugated diene polymer backbone; and
   a modifying group, wherein the modifying group has a structure represented by formula (1):

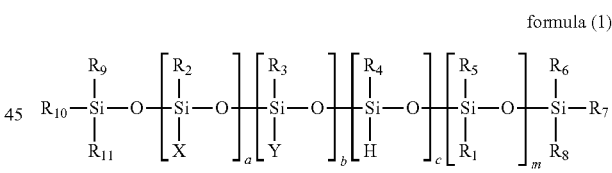
formula (1)

wherein $R_1$-$R_{11}$ each independently represent a $C_1$-$C_5$ alkyl group;

$1 \leq m \leq 300$;

$0 \leq a \leq 65$;

$0 \leq b \leq 65$;

$0 \leq c \leq 40$;

$0 < a+b$;

$0 \leq c/(a+b+c) \leq 0.8$; and the X and Y are structures respectively represented by formula (2) and formula (3):

formula (2)

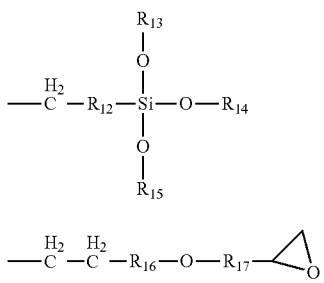

formula (3)

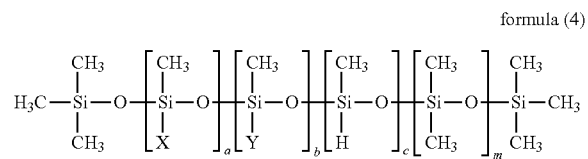

wherein $R_{12}$, $R_{16}$, and $R_{17}$ each independently represent a $C_1$-$C_5$ alkylene group, $R_{13}$-$R_{15}$ each independently represent a $C_1$-$C_5$ alkyl group, and the modifying group is physically joined or chemically bonded to the conjugated diene polymer backbone.

9. The modified conjugated diene polymer of claim 8, wherein the modified group has a structure represented by formula (4):

formula (4)

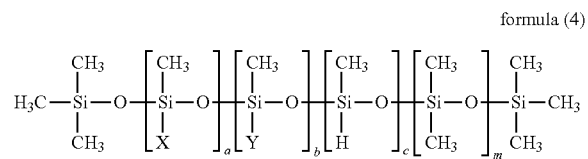

wherein the X and Y are structures respectively represented by formula (5) and formula (6):

formula (5)

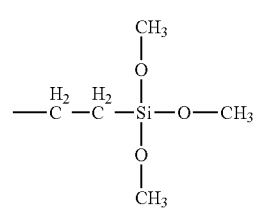

formula (6)

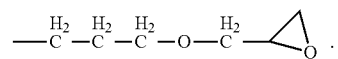

10. The modified conjugated diene polymer of claim 8, wherein c/(a+b+c)≤0.6.

11. The modified conjugated diene polymer of claim 10, wherein c=0.

12. The modified conjugated diene polymer of claim 8, wherein 0.2≤a/(a+b+c)≤0.9 and 0.10≤b/(a+b+c)≤0.8.

13. The modified conjugated diene polymer of claim 8, wherein a/(a+b+c)=0.6 and b/(a+b+c)=0.4.

14. The modified conjugated diene polymer of claim 8, wherein a cis content thereof is greater than 90%.

15. A rubber composition comprising silica and the modified conjugated diene polymer of claim 8.

\* \* \* \* \*